Figure 4:
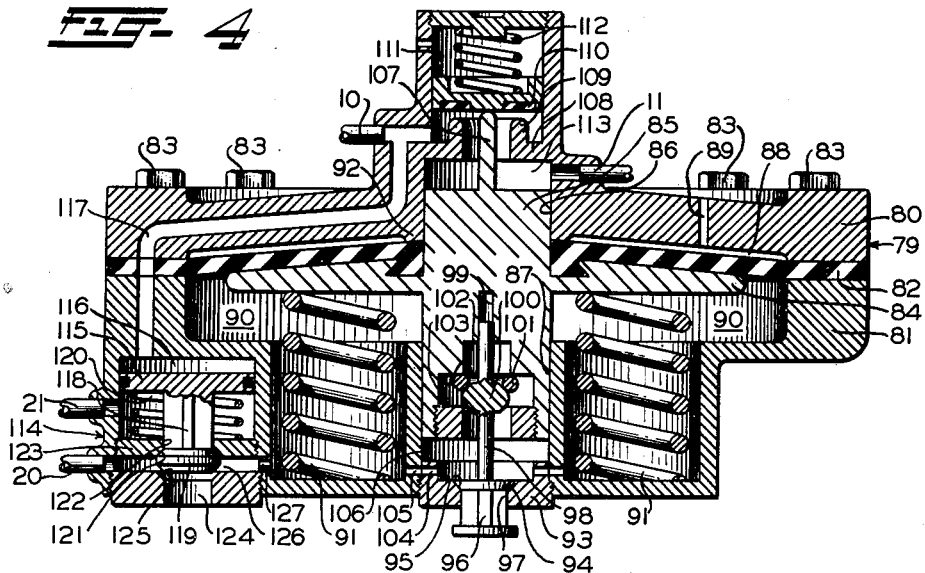

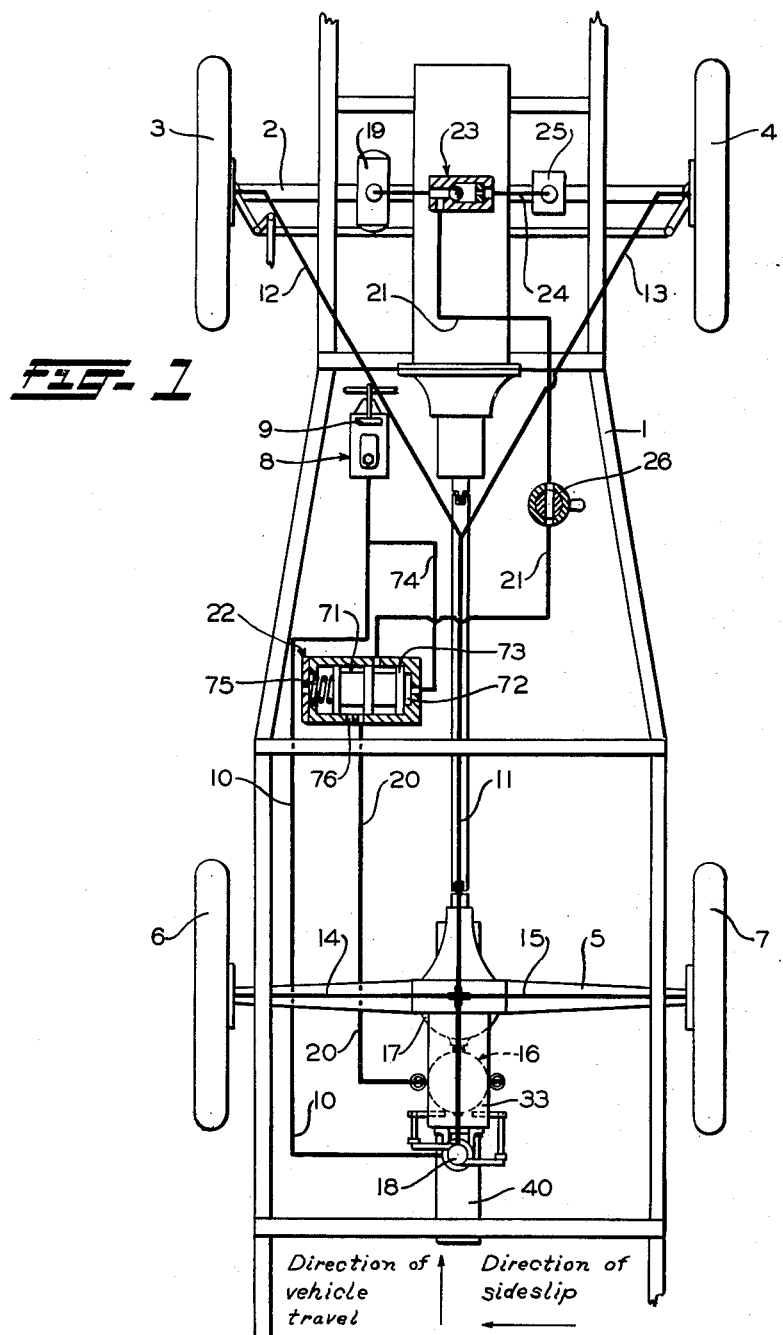

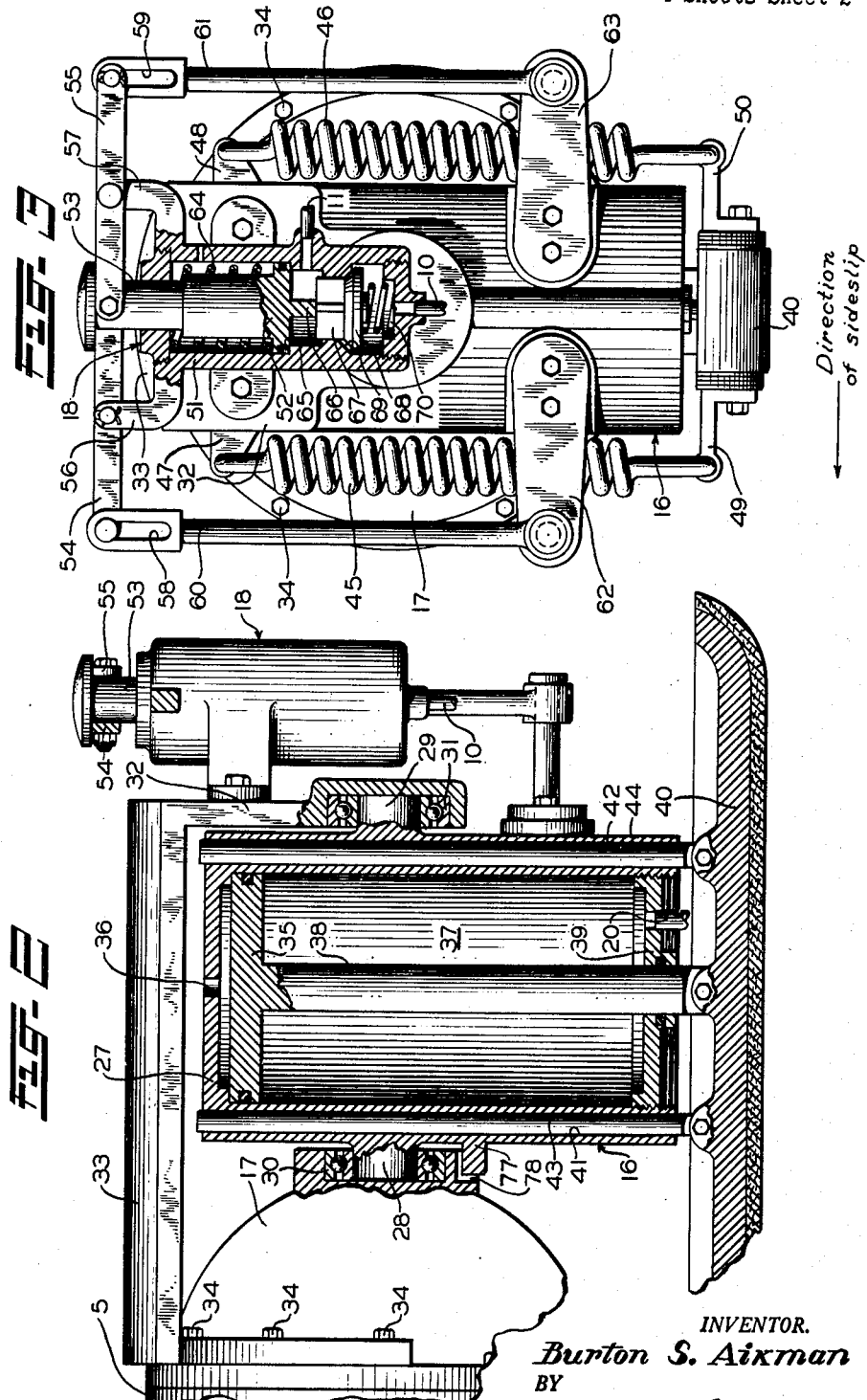

May 24, 1960  B. S. AIKMAN  2,937,719
APPARATUS FOR PREVENTING SIDESLIP OF AUTOMOTIVE VEHICLES
Filed July 16, 1957  4 Sheets-Sheet 3

INVENTOR.
Burton S. Aikman
BY
ATTORNEY

May 24, 1960
B. S. AIKMAN
2,937,719
APPARATUS FOR PREVENTING SIDESLIP OF AUTOMOTIVE VEHICLES
Filed July 16, 1957
4 Sheets-Sheet 4
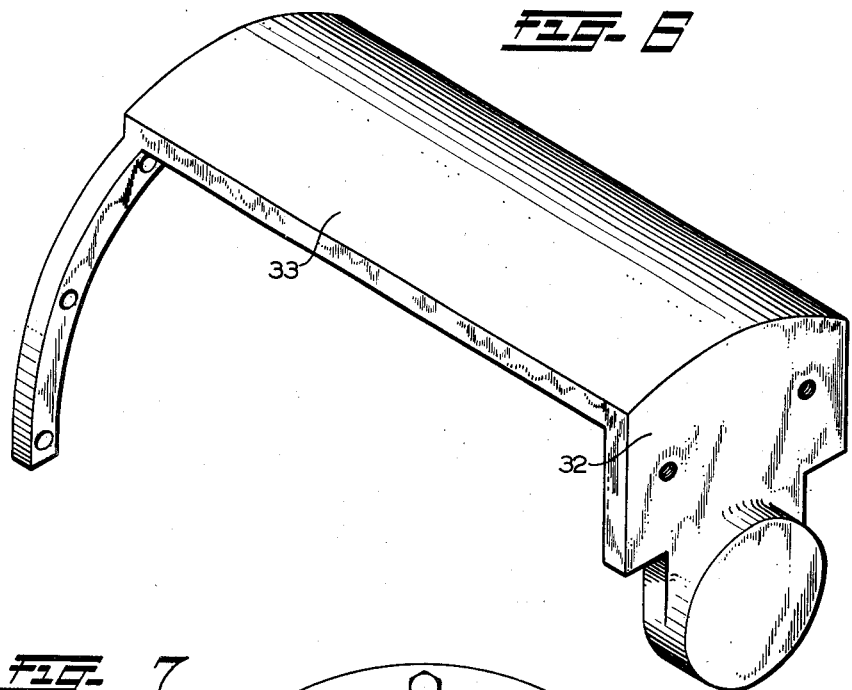
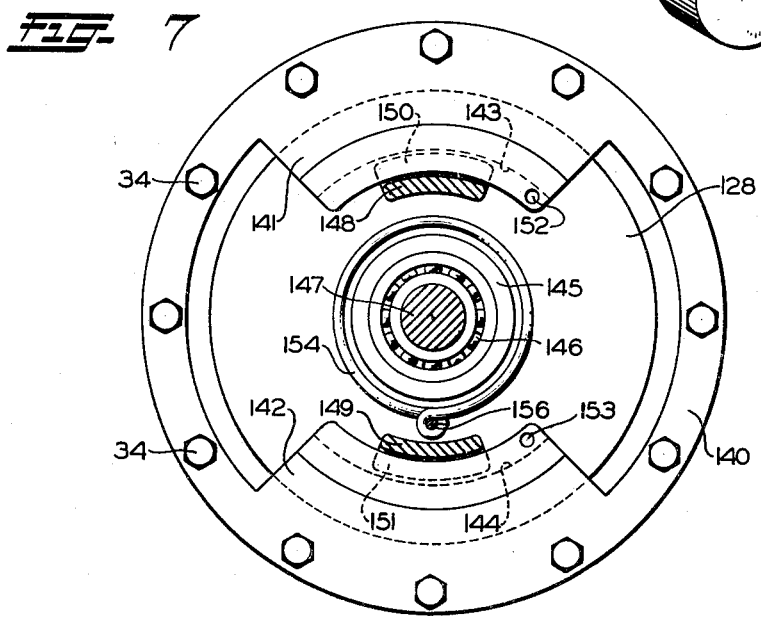
INVENTOR.
Burton S. Aikman
BY
ATTORNEY United States Patent Office 2,937,719
Patented May 24, 1960

2,937,719

APPARATUS FOR PREVENTING SIDESLIP OF AUTOMOTIVE VEHICLES

Burton S. Aikman, St. Petersburg, Fla., assignor to Westinghouse Air Brake Company, Wilmerding, Pa., a corporation of Pennsylvania Filed July 16, 1957, Ser. No. 672,255

14 Claims. (Cl. 188—5)

This invention relates to apparatus for inhibiting or preventing sideslip of automotive vehicles and, more particularly, to such apparatus that may be adapted to automotive vehicles of the passenger car or small truck types.

The term "sideslip," as used hereinafter, will refer to any lateral movement of the rear portion of the vehicle relative to the intended direction of travel of the vehicle. Sideslip more commonly occurs during braking or retardation of the vehicle driving wheels (usually the rear wheels) at a rate inconsistent with or in excess of the existing traction between said wheels and the road surface, such as may occur, for example, when the rear wheels of a vehicle are excessively braked on an icy road surface where very little traction exists between the wheels and the road surface. It is obvious that such sideslip may result in serious damage to both the vehicle and the passengers.

The problem of sideslip, as above discussed, is particularly of concern with respect to tractor-trailer vehicles because of the possible result of "jackknifing" or angling of the trailer relative to the tractor. U.S. patent application, Serial No. 618,752, filed October 29, 1956, now U.S. Patent No. 2,885,030, discloses an apparatus for inhibiting sideslip of automotive vehicles of the tractor-trailer type.

Since the problem of sideslip is not limited to tractor-trailer vehicles, but may also occur with vehicles such as passenger autos and smaller trucks, the present invention is directed toward providing means for this type of automotive vehicle, also for preventing or correcting sideslip conditions. Essentially the present invention comprises a cylinder device pivotally mounted on the differential housing on the rear axle of the vehicle and operable under the control of the vehicle operator in conjunction with the vehicle wheel brakes for actuating a ski-type braking element, upon imminence or actual occurrence of sideslip, into engagement with the road surface for, in effect, steering the vehicle into track with the intended direction of travel, and valve means automatically operable by pivotal motion of said cylinder device for effecting release of the wheel brakes, upon actual occurrence of sideslip, by relieving the wheel brake cylinders of actuating fluid pressure. An alternate embodiment of the invention provides means for effecting alternately a wheel brake application and a release of the application during such time that the sideslip apparatus is brought into operation for correcting any imminent or actual sideslip condition.

The principal object of the invention, therefore, is to provide an apparatus of the general type above described which may be adapted to automotive vehicles including the small truck and passenger car types.

Figure 5:
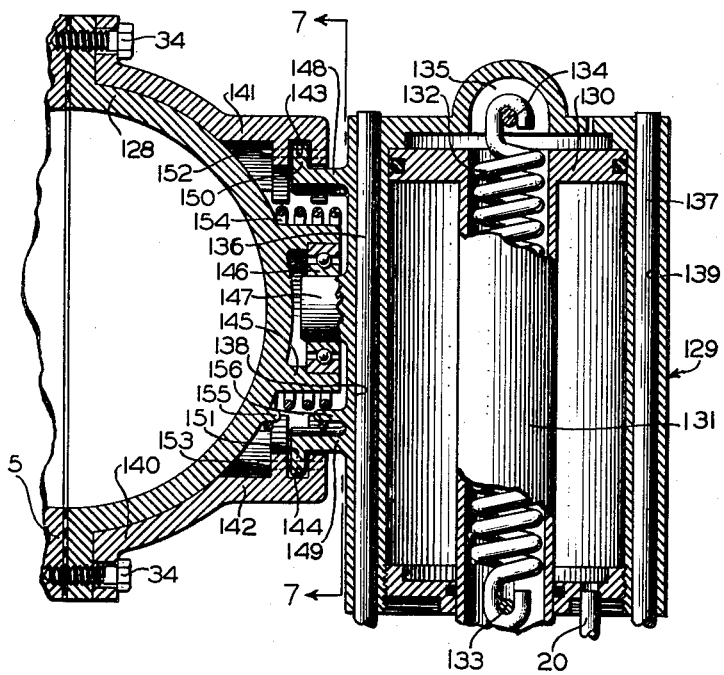

Other objects and advantages of the invention will become evident when the following more detailed description thereof is read in conjunction with the accompanying drawings wherein:

Fig. 1 is a plan view generally showing the schematic arrangement of the sideslip preventing apparatus on a conventional automotive chassis, Fig. 2 is an elevational view, partly in section and partly in outline and on a somewhat enlarged scale, of portions of the sideslip preventing apparatus showing one embodiment of the invention, Fig. 3 is an elevational view, partly in section and partly in outline, of the embodiment in Fig. 2 looking toward the right-hand side of Fig. 2, Fig. 4 is a sectional view, on an enlarged scale, of a modification of a portion of the invention comprising a control valve device for use with the sideslip preventing apparatus, Fig. 5 is an elevational view, mostly in section, of another modification of a portion of the invention, comprising the operating cylinder device, Fig. 6 is a perspective view, on an enlarged scale, of a bracket for the arrangement shown in Fig. 2, and Fig. 7 is a sectional view of the modification shown in Fig. 5, taken along line 7—7 of Fig. 5, looking in the direction of the arrows.

*Description and operation—Figs. 1, 2, 3 and 6*

Referring to Fig. 1 of the drawings, a suitable arrangement of an apparatus for preventing sideslip of an automotive vehicle is shown in schematic form. A conventional automobile chassis 1 is shown having a front axle 2, on which wheels 3 and 4 are mounted, and a rear axle housing 5 on which wheels 6 and 7 are mounted for rotation in the usual manner.

Each of the wheels 3, 4, 6 and 7 is provided with some conventional braking means, although not completely shown, such as brake drums in which brake shoes may be actuated by respective hydraulically operable wheel cylinders, operation of the shoes and cylinders being controlled in the usual manner by a manually operable master cylinder device 8 having a foot pedal 9 upon which the operator of the vehicle may apply foot pressure for effecting a brake application on the vehicle wheels, and release such foot pressure for effecting a release of the brake application in the well-known manner. The master cylinder device 8 is connected to the individual wheel cylinders through a main conduit shown in two sections 10 and 11, with branch conduits 12, 13, 14 and 15 leading from said main conduit to the respective wheel cylinders on wheels 3, 4, 6 and 7.

The apparatus embodying the invention as represented in Fig. 1, comprises an operating cylinder device 16 supported, in a manner to be more fully described hereinafter, by the axle housing 5 cooperative with a cover plate 17 on the outer side of said axle housing toward the rear of the vehicle, through which cover plate access may be had to the usual differential gear mechanism (not shown) provided on automotive vehicles and carried in said axle housing. A release valve device 18, associated with the cylinder device 16, is interposed between the conduit sections 10 and 11. The cylinder device 16 is connected to a source of sub-atmospheric pressure, such as a storage reservoir 19, by way of a conduit of two sections 20 and 21, a pilot valve device 22 being interposed between the two conduit sections 20, 21 and a one-way check valve device 23 being provided in conduit 21 between the valve device 22 and the reservoir 19. The reservoir 19 and conduit 21 are connected by a conduit 24 to an intake manifold 25 of the vehicle engine whereby sub-atmospheric pressure may be established in the system for operating the cylinder device 16 in a manner to be more fully described hereinafter. A manually operable cut-out valve device 26 may be provided in conduit 21 between the intake manifold 25 and the pilot valve device 22 for rendering the sideslip preventing apparatus inoperative by operating said cut-out valve from an open position in which communication through said conduit 21 is open, to a closed position in which said communication between said intake manifold and said pilot valve device is closed.

More specificaly, as shown in Figs. 2 and 3, the operating cylinder device 16 comprises a substantially cylindrical casing 27 having formed exteriorly thereof, at diametrically opposite points, two coaxial journals 28 and 29 which are supported in respective frictionless bearings 30 and 31 to permit pivotal motion of said cylinder device about the axis of said journals. Bearing 30 is supported in the cover plate 17 in coaxial relation with bearing 31 which is supported in a vertically depending arm 32 of a bracket 33 secured to the axle housing 5 common with the cover plate 17 by means of a plurality of bolts 34, said bracket extending perpendicularly away from said axle housing toward the rear of the vehicle. The bracket 33 may be more clearly seen in the enlarged-scale perspective view in Fig. 6. The common axis of bearings 30 and 31 is parallel to the axis and normal direction of travel of the vehicle, so that any pivotal motion of the cylinder device 16 occurs in a lateral direction perpendicular to the axis of the vehicle for reasons to be hereinafter explained.

The cylinder device 16 contains therein a vertically operable piston 35 having its upper side, as viewed in the drawing, exposed to atmospheric pressure by way of a port 36 in casing 27 and the lower side open to a sub-atmospheric pressure chamber 37 defined by said piston and said casing, said chamber being connected to conduit 20 leading to the pilot valve device 22. A piston rod 38 extends vertically downwardly away from the lower side of piston 35, through chamber 37, and through a removable base cap 39 forming part of casing 27, said piston rod terminating exteriorly of the casing to support at said exterior end a ski-type brake shoe 40. Two vertical bores 41 and 42 are provided in diametrically opposite relation in the casing 27, in which bores respective guide rods 43 and 44, each having one end fixed to the brake shoe 40, are slidably operable for maintaining said brake shoe in a parallel relation to the axis of the vehicle. Two springs 45 and 46, each having one end attached to respective lugs 47 and 48 formed on opposite sides of the casing 27 and the other end attached to respective lugs 49 and 50 fixed on opposite sides of the brake shoe 40, serve to constantly bias said brake shoe and the piston 35 to normal uppermost or elevated position in which said brake shoe is out of contact with the roadway.

The release valve device 18, which is vertically supported in fixed relation to and by the depending arm 32 of bracket 33 adjacent the top portion of the cylinder device 16, comprises a casing 51 in which a vertically disposed piston 52 is slidably operable, said piston having a stem 53 extending coaxially from one side thereof through the top portion of said casing and terminating exteriorly thereof. Two lever arms 54 and 55, each having one end pivotally fastened to the exterior end of the piston stem 53 and each extending horizontally and oppositely away from said piston stem, are each pivotally fulcrumed substantially intermediate their ends on two respective fulcrum arms 56 and 57 affixed to the casing 51 of the release valve device 18. The ends of lever arms 54 and 55 opposite the ends fastened to the piston stem 53 are pivotaly connected in respective elongated slots 58 and 59 formed in one end of each of two depending link rods 60 and 61, whereby said link rods, under certain conditions to be hereinafter described, are afforded a limited amount of free vertical movement relative to said lever arms, while the opposite ends of said link rods 60 and 61 are pivotally connected to two respective anchor brackets or arms 62 and 63 affixed to and adjacent the lower portion of casing 27 of the cylinder device 16 and extending away from each other in substantially parallel relation to the lever arms 54, 55.

The piston 52 in the release valve device 18 is urged by a spring 64 toward a normal position defined by engagement of the piston with a shoulder 65 formed internally of the casing 51. The spring 64, by urging the piston 52 toward its normal position, and thereby acting through said piston and the linkage immediately above described, serves to bias the cylinder device 16 toward a normal vertical postion relative to the road surface. A relatively short stem 66 projects coaxially from the side of piston 52 opposite stem 53 and is adapted, when said piston is in its normal position, for engaging a fluted stem 67 formed on a poppet type valve 68 operable within the casing 51 in a manner to be hereinafter described. The effective force of spring 64, acting through the piston 52 and the stem 66, acts to maintain valve 68 in an unseated position from a valve seat 69 formed in the casing 51 against the opposing force of a spring 70 constantly urging said valve toward a seated position on said valve seat, said spring 70 exerting a lesser force on valve 68 than the force of spring 64. When the poppet valve 68 is in its unseated position, communication is established between conduits 10 and 11 whereby pressurized hydraulic fluid may flow to the wheel brake cylinders (not shown), whereas when said poppet valve is in its seated position, such communication and supply of hydraulic fluid is cut off.

The pilot valve device 22 (Fig. 1) comprises a casing in which a spool-type piston valve 71, for example, is operable responsively to pressurized hydraulic fluid in a hydraulic fluid chamber 72, defined by the casing and a piston 73 associated with said piston valve, said chamber being connected by a branch conduit 74 to the conduit 10 leading from the master cylinder device 8. If the pressure applied to the hydraulic fluid in conduits 10 and 74 by operating the foot pedal 9, and consequently the force of such pressure in chamber 72, is sufficient for overcoming the opposing force of a spring 75 acting on the piston valve 71, said piston valve will be operated out of a normal position, in which it is shown in the drawing and in which conduit 20, and therefore chamber 37 of cylinder device 16, are open to atmosphere by way of a port 76 in the casing of the pilot valve device, to an operating position, in which said conduit 20, and consequently said chamber 37, are closed to atmosphere and opened to conduit 21 and sub-atmospheric pressure therein for a purpose to be hereinafter explained.

In operation, let it be assumed that the vehicle, equipped with the apparatus embodying the invention, is traveling under normal conditions on the highway, the intake manifold 25 having exhausted the reservoir 19 and conduit 21 to a sub-atmospheric pressure. The cut-out valve device 26 is in its open position. For normal braking, the operator of the vehicle manually applies pressure to the foot pedal 9 of the master brake cylinder device 8 in accordance with the degree of braking or retardation desired. Pressurized hydraulic fluid flows through conduit 10, past the unseated valve 68 of the release valve device 18, and through conduit 11 to branch conduits 12, 13, 14 and 15 to the respective wheel brake cylinders (not shown) to effect a brake application on the wheels. Release of the brake application, of course, is effected by releasing manual pressure on the foot pedal 9.

Let it further be assumed, however, during the course of such travel that the operator of the vehicle either senses that sideslip of the rear wheels 6 and 7 is imminent or that it actually does occur either due to excessive braking, for example, on a slippery highway surface or due to some other undetermined cause. In any event, in order to correct the condition of either imminent or actual sideslip the operator manually applies sufficient pressure on the foot-pedal 9 to pressurize the hydraulic fluid in conduit 10 and, therefore, in branch conduit 74 and chamber 72 of the pilot valve device 22, to a degree sufficient for overcoming the opposing force of spring 75 and thereby effect operation of the piston valve member 71 to its operating position in which, as above noted, chamber 37 of the cylinder device 16 is closed to atmosphere by way of conduit 20 and port 76 in said pilot valve device, and opened to sub-atmospheric pressure in conduit 21.

With chamber 37 of the cylinder device 16 at sub-atmospheric pressure and such pressure therefore effective on the side of piston 35 adjacent said chamber, atmospheric pressure acting on the opposite side of said piston is effective for moving the piston, and consequently the brake shoe 40, downwardly against the opposing force of springs 45 and 46, to a lowered position until said brake shoe engages the road surface. If sideslip has not already occurred, the ski-type brake shoe 40, when engaged with the road surface, is effective for maintaining the vehicle in its normal direction of travel and removing any imminent threat or tendency of sideslip.

Let it be assumed, however, that the vehicle is actually in a condition of sideslipping, the direction of said sideslip relative to the direction of travel being as indicated by the arrows in Figs. 1 and 3, when the brake shoe 40 engages the road surface as above described. Upon engagement of the brake shoe 40 with the road surface and with the vehicle sideslipping in the direction indicated, the cylinder device 16 will be pivoted out of its normal vertical position about the axis of the journals 28 and 29 in a counterclockwise direction, as viewed in the drawing, said pivotal motion being limited, whether in a clockwise direction or a counterclockwise direction, by engagement of a lug 77, formed exteriorly of the casing 27 of the said cylinder device, with one of two shoulders formed on the portion of the differential cover plate 17 supporting the bearing 30, only one of said shoulders being shown in the drawing and being designated by the numeral 78, it being understood that the other shoulder (not shown) is located oppositely said one shoulder to be engaged by lug 77 when said cylinder device pivots in a clockwise direction.

When the cylinder device 16 is pivoted in a counterclockwise direction, the anchor arms 62, 63 are carried with the cylinder device and, therefore move the links 60, 61 with them, the link 61 in this instance merely riding in the slot 59 without having any effect on the lever arm 55, it being recalled that the release valve device 18 is fixed in relation to the cylinder device 16. Link 60, however, in moving with the anchor arm 62, will pull downwardly, as viewed in the drawing, on the lever arm 54, pivoting said lever arm in a counterclockwise direction about its pivot point on the fulcrum arm 56. It should be understood, of course, that the extent to which the lever arm is pivoted by the associated linkage depends upon the extent of sideslip and therefore the extent to which the cylinder device 16 is pivoted. Pivotal movement of lever arm 54, which, it will be recalled, has one end fastened to stem 53 of the release valve device 18, serves to lift said stem, piston 52, and stem 66 against opposing force of spring 64 thereby allowing spring 70 to seat valve 68 on seat 69 to cut off further supply of pressurized hydraulic fluid, via conduit 11, to the wheel brake cylinders. It should also be understood that in the event the direction of sideslip is opposite to that indicated, the apparatus will function similarly to the manner above described except that the link 61 will pull downwardly on lever arm 55 to effect operation of the release valve device as immediately above and below described.

Depending upon the degree or extent of sideslip, and therefore the extent of movement of the lever arm 54, as above described, the amount of upward movement of stem 53 and piston 52 is proportionately in accordance therewith. As above noted, initial upward movement of piston 52 permits valve 68 to seat. Further upward movement of piston 52 provides a displacement volume for hydraulic fluid in conduit 11 whereby the back flow of hydraulic fluid from said conduit into said displacement volume effects a release of the brake application on the vehicle wheels to allow said wheels to rotate freely and thereby render the brake shoe 40 effective for righting the vehicle into the intended direction of travel.

Upon correction of the sideslip situation, as above described, the cylinder device 16 will be returned to its normal vertical position, and the links 60, 61 will resume their normal positions thereby rendering the spring 64 effective for restoring lever arms 54, 55 and the piston 52 to their normal positions. When the piston 52 moves downwardly to its normal position, the hydraulic fluid displaced by upward movement of said piston will be returned to conduit 11 to effect reapplication of the brakes, at least momentarily, and stem 66 will engage fluted stem 67 to unseat valve 68 thereby establishing communication between conduits 10 and 11. With valve 68 in its unseated position, the operator of the vehicle may continue to supply pressurized hydraulic fluid to the wheel brake cylinders or release such supply as the situation demands and as above described. Should sideslip threaten or actually reoccur, the operator of the vehicle would again follow the procedure above explained.

*Description and operation—Fig. 4*

Fig. 4 represents an alternate means for controlling the sideslip preventing apparatus, by which means a pulsating effect of brake application and release of the wheel brakes is obtained while the sideslip control apparatus is in operation. This alternate means consists of a control valve device 79 operable responsively to the degree of fluid pressure in the supply conduit 10, said control valve device being adaptable to the general scheme shown in Fig. 1 by substituting said control valve device for the release valve device 18 and its associated linkage (lever arms 54, 55; links 60, 61; and anchor arms 62, 63) and the pilot valve device 22 in the manner described below. With the elimination of lever arms 54, 55, links 60, 61, anchor arms 62, 63, and spring 64 (in the release valve device 18), some other means for biasing the operating cylinder device to its normal vertical position must be provided. For the time being, however, let it suffice to assume that such means, as hereinafter will be described, is provided.

The control valve device 79 may comprise a casing of two sections 80 and 81 between which a flexible diaphragm 82 is clamped adjacent its periphery by suitable means such as a plurality of bolts 83, for example. The diaphragm 82 is fastened adjacent its center, in suitable manner not shown, in sealing relation to a follower member 84 having a stem 85 slidably operable in coaxially aligned and oppositely facing guide bores 86 and 87 formed in casing sections 80 and 81 respectively. The upper side of diaphragm 82, as viewed in the drawing, is open to atmospheric pressure in a chamber 88 via a vent 89 in the casing, while the lower or opposite side of said diaphragm is open to a sub-atmospheric chamber 90.

A plurality of springs 91 constantly urge the follower 84 and stem 85, and therefore diaphragm 82, toward a normal position defined by engagement of the diaphragm and follower with an annular shoulder 92 formed internally of casing section 80 and surrounding bore 86. In a manner to be hereinafter described, the diaphragm 82, and therefore follower 84 and stem 85, are operable against the opposing force of springs 91 to a release position defined by engagement of the lower end of stem 85 with a closure cap 93 screwed into the lower end of bore 87. The closure cap 93 has coaxially disposed therein a poppet type valve 94 operable from a seated position, in which said valve seats on an annular seat 95 formed internally of the closure cap, to an unseated position off said valve seat, in which fluid at atmospheric pressure may flow past said unseated valve, said valve having a fluted valve stem 96 extending coaxially from the lower side thereof through and slidably operable in a bore 97 formed in said closure cap for guiding movement of said valve.

A comparatively longer stem 98 extends coaxially from the side of valve 94 opposite stem 96 into and through a recess formed in the lower end of stem 85, said stem 98 terminating and loosely fitting in a guide bore 99 formed coaxially in stem 85. The stem 98 is provided, substantially intermediate its two ends, with a coaxially formed knob 100 having a central maximum diameter concentric with the axis of said stem and gradually reducing in diameter toward both ends of the knob. An expandible split or snap ring 101 having an internal normal diameter, when in a contracted state, somewhat smaller than the maximum diameter of knob 100, is adapted for snapping or riding over the largest portion of the knob between two oppositely facing shoulders 102 and 103 formed in the recess of stem 85, each of said shoulders alternately engaging and forcing said ring over said largest portion upon reciprocating movement of said piston stem between its normal position and release position. A plurality of passageways 104 formed in the closure cap 93 register with a plurality of passageways 105 formed in an internal wall of casing section 81 to provide communication between sub-atmospheric chamber 90 and a chamber 106 adjacent the upper side of valve 94.

The stem 85 has a smaller diameter stem 107 extending coaxially from the upper end of stem 85 through a bore formed in a valve seat element 108 formed in and fixed in relation to casing section 80, said valve seat element comprising an annular rib seat 109 surrounding the bore through which said stem 107 extends to engage and to thereby normally maintain a valve member 110 in an unseated position off said rib seat when the stem 85 is in its normal position, said valve member being slidably operable in a bore 111 formed in said casing section 80. A spring 112 constantly urges valve member 110 toward a seated position on the seat rib 109 and effects seating thereof on said seat rib upon movement of stem 85 to its release position. The purpose of valve 110 is to control communication between hydraulic fluid inlet conduit 10 and the outlet conduit 11 by opening said communication when in its unseated position and by closing said communication when in its seated position, the downward movement of stem 85 to its release position providing an expandible chamber or volume 113 for back-flow of hydraulic fluid in the wheel brake cylinders to thereby effect release of the wheel brakes when valve 110 is operated to its seated position.

A pilot valve device 114, associated with the control valve device 79, is disposed in a convenient portion of casing section 81 and comprises a piston 115 having one side exposed to a chamber 116 connected by a passageway 117 to the hydraulic fluid inlet conduit 10 and, therefore, subject to the pressure of said hydraulic fluid. The piston 115 has a fluted stem 118 extending coaxially from the side opposite chamber 16, which stem carries at its extremity opposite said piston a poppet type, double-beat, alternately-seating valve 119 for controlling communication between conduits 20 and 21. Piston 115 and valve 119 are urged by a spring 120 toward and normally occupy a first position in which said valve is seated on a valve seat 121 surrounding an opening 122 in a separating wall 123, and in which first position communication between conduits 20 and 21 through said opening is closed and said conduit 20 is opened to atmosphere via an opening 124 in casing section 81. Upon preponderance of hydraulic fluid pressure in chamber 116 acting on piston 115 over opposing force of spring 120 acting on said piston, the piston and valve 119 will be moved to a second position in which said valve is unseated from valve seat 121 to open communication between conduits 20 and 21 and is seated on a valve seat 125 oppositely facing valve seat 121 and surrounding opening 124 to close conduit 20 to atmosphere. Since the pressurized hydraulic fluid passing through conduit 10 and therefore present in chamber 116 by way of passageway 117, is also the supply for operating the wheel brake cylinders for applying the wheel brakes, predetermined strength of spring 120, before yielding to opposing hydraulic pressure acting on piston 115, should be such as to require a certain high degree of hydraulic pressure in said chamber somewhat in excess of a maximum normal degree of hydraulic pressure required in the wheel brake cylinders to insure any normal operations of the wheel brakes without necessarily effecting operation of the pilot valve device 114 and, therefore, the sideslip preventing apparatus in a manner to be hereinafter described.

In operation, let it be assumed that the control valve device 79 has been substituted in the general scheme shown in Fig. 1 for the pilot valve device 22 and the release valve device 18 with its associated linkage (lever arms 54, 55; links 60, 61; and anchor arms 62, 63) by connecting conduits 10 and 11 to the inlet and outlet sides, respectively, of valve 110 and by connecting conduits 21 and 20 to the upper and lower sides, respectively, as viewed in the drawing, of separating wall 123 of the pilot valve device 114. The branch conduit 74 is eliminated.

For all normal operations of the wheel brakes, while the vehicle is traveling on the highway, the operator of the vehicle need merely apply manual pressure to the foot pedal 9 of the master cylinder device 8, to an extent proportional to the degree of braking desired, so as to pressurize the hydraulic fluid in conduit 10 which flows past unseated valve 110 into conduit 11 leading to branch conduits 12, 13, 14 and 15 to the wheel brake cylinders for effecting a brake application on the vehicle wheels, the degree of pressurization of said hydraulic fluid being kept below the certain high degree, above described, that would effect operation of the sideslip preventing apparatus. In order to effect release of the brake application, the operator need merely release the manual pressure on foot pedal 9.

Let it be assumed that the operator, sensing either imminent or actual occurrence of sideslip during travel of the vehicle, applies manual pressure to the foot pedal 9 sufficiently to pressurize the hydraulic fluid in conduit 10, and therefore in chamber 116 of the pilot valve device 114, and in conduit 11, and therefore in the wheel brake cylinders, to a degree in excess of the maximum normal degree required for normal braking operations. Such degree of pressure, of course, will effect an initial application of the wheel brakes, but, by acting on piston 115 in chamber 116, will also overcome the opposing force of spring 120 to move said piston and valve 119 from their first position to their second position in which, as above noted, conduit 20 is cut off from atmosphere and placed in communication with conduit 21 and sub-atmospheric pressure therein, thereby subjecting chamber 37 of cylinder device 16 to sub-atmospheric pressure. With chamber 37 at sub-atmospheric pressure the cylinder device 16 will operate, as above described, to move brake shoe 40 into engagement with the road surface. As long as the operator of the vehicle maintains sufficient pressure on brake pedal 9 and, therefore, hydraulic pressure in chamber 116 to maintain piston 115 and valve 119 in their second position, the brake shoe 40 will remain in contact with the road surface.

When valve 119 is in its second position, chamber 90 below diaphragm 82 is placed into communication with conduit 21 and sub-atmospheric pressure therein through a passageway 126 having a restricting choke 127 formed in the casing wall, said passageway being arranged to open to atmosphere by way of opening 124 when valve 119 is in its first position. With chamber 90 open to sub-atmospheric pressure by way of choke 127, pressure in said chamber is gradually reduced until atmospheric pressure in chamber 88 acting on diaphragm 82 is effective for moving said diaphragm, and consequently follower 84, stem 85 and stem 107, against the opposing force of springs 91 downwardly from their normal position to their release position, such downward movement of stem 107 permitting valve 110 to seat on seat rib 109 to cut off further supply of pressurized hydraulic fluid and downward movement of stem 85 providing an expansion of chamber 113 into which hydraulic fluid from the wheel brake cylinders may flow back through conduit 11 to effect a momentary release of the brakes, as will presently be observed.

Downward movement of stem 85 also causes shoulder 102 to force snap ring 101 to ride down over the center of knob 100 by momentarily forcing said snap ring to expand diametrically and lodge underneath said knob against shoulder 103 where the snap ring again contracts to its normal diameter thereby forcing said knob upwardly against shoulder 102. When the knob 100, and therefore stem 98 move upwardly, valve 94 is unseated from seat 95 to open chamber 90 to atmosphere via opening 97 and passageways 104 and 105 to immediately equalize pressure on both sides of diaphragm 82, choke 127 serving to restrict flow of atmospheric pressure into passageway 126, and render springs 91 effective for returning said diaphragm, along with follower 84 and stems 85 and 107, to their normal position. Movement of stem 107 to its normal position effects unseating of valve 110 from seat rib 109 to allow supply of pressurized hydraulic fluid to flow from conduit 10, past said unseated valve, to conduit 11 and the wheel brake cylinders, while at the same time upward movement of stem 85 forces the hydraulic fluid in expanded chamber 113 back out into conduit 11 and to said wheel brake cylinders, thereby effecting immediate reapplication of the wheel brakes.

At the same time that stem 85 moves upwardly, as above described, shoulder 103 forces snap ring 101 to ride up over the center of knob 100 to resume its position against shoulder 102 thereby moving valve 94, through stem 98, to its seated position on seat 95 to again cut off chamber 90 from atmosphere. With chamber 90 again closed to atmospheric pressure, the subatmospheric pressure effected through choke 127 will again gradually diminish the pressure in said chamber until atmospheric pressure in chamber 88 acting on diaphragm 82 is effective for overcoming the opposing force of spring 91 and for moving said diaphragm, along with stems 85 and 107, downwardly to again effect a momentary release of the wheel brakes, as above described.

The cycling action, as immediately above described, of the control valve device 79 will continue as long as the operator of the vehicle maintains sufficient pressure on the foot pedal 9 to effect continued seating of valve 119 of the pilot valve device 114 whereby sub-atmospheric pressure may reach chamber 90 via passageway 126 and choke 127.

The control valve device 79 operates with the cycling action above described whether there is merely a threat of sideslip, or whether there is actual sideslip and therefore pivotal movement of the operating cylinder device 16 out of its normal vertical position. This cycling action of the control valve device 79 thus effects pulsations of application and release of the wheel brakes while the brake shoe 40 is engaged with the road surface thereby assisting said brake shoe in righting the vehicle and eliminating the threat or actual condition of sideslip. When this undesirable condition has been removed, the operator of the vehicle releases pressure on the foot pedal 9, at least sufficiently to effect a reduction of hydraulic pressure on the piston 115 of pilot valve 114 to a degree below the maximum normal degree, whereby piston 115 is returned to its first position and valve 119 is seated on seat 121. With valve 119 seated on seat 121, chamber 37 of the cylinder device 16 is closed to conduit 21 and sub-atmospheric pressure therein, and is opened to atmosphere by way of opening 124 in the pilot valve device 114 and conduit 20. Equalization of pressure on both sides of piston 35 of the cylinder device 16 thus renders springs 45 effective for restoring said piston and shoe 40 to their normal position, and said cylinder device is returned to its normal vertical position by the biasing means above mentioned and immediately below described. The operator may then control the wheel brakes as the situation demands.

*Description and operation—Figs. 5 and 7*

Figs. 5 and 7 illustrate an alternate means for mounting the operating cylinder device to the axle housing 5 including a modified differential housing cover plate 128 and biasing means, which cover plate and biasing means may be substituted for the cover plate 17 and the linkage and spring 64 described in connection with the structure shown in Figs. 2 and 3, said biasing means being provided for biasing the operating cylinder device to its normal vertical position when the control valve device 79 is employed in place of the release valve device 18, the pilot valve device 22 and said linkage. Fig. 5 also illustrates an alternate type operating cylinder device, designated by reference numeral 129, which may be employed in lieu of operating cylinder device 16 above described.

The operating cylinder device 129 functions in a manner similar to that of operating cylinder device 16, said cylinder device 129 also being provided with a piston 130 corresponding to piston 35 of cylinder device 16. One of the principal differences between operating cylinder devices 16 and 129 is that the piston 130 of the latter is provided with a hollow stem 131 closed at the lower end opposite the piston, in which stem a spring 132 is coaxially disposed, under tension, by having one end anchored to a pin 133 sealingly fixed in said lower end of the stem and the other end anchored to a pin 134 fixed in a recess 135 formed in the casing of the cylinder device, said spring serving a similar function as springs 45, 46 associated with cylinder device 16. The brake shoe 40 is fastened to the lower end of stem 131 in a manner similar to that illustrated in Fig. 2. Two guide bars 136, 137 slidably operable in respective bores 138, 139 are also fastened to the brake shoe 40 and function in similar fashion to the guide bars 43, 44 of the cylinder device 16.

When the control valve device 79 is employed with either of the operating cylinder devices 16 or 129, the preferred structure and manner for mounting the cylinder device onto the differential housing cover plate 128 are as follows. It should be understood, of course, that if the cylinder device 16 is employed with the control valve device 79, the casing of said cylinder device must be modified to correspond to the mounting structure described below.

A bracket for mounting the cylinder device comprises an annular portion or ring 140 which is provided with bolt holes corresponding to those on the rear axle housing 5 and the differential cover plate 128, so that when the cover plate is bolted into place with the bolts 34, said bracket is bolted to said housing with said cover plate in such a position that two diametrically opposite sector portions 141, 142 formed on said annular portion, will lie in a vertical position relative to the axle housing and to the road surface. Each of the sectors 141, 142 are provided with respective arcuate grooves 143, 144 formed on a uniform radius concentrically of the annular portion 140.

The cover plate 128 is provided with a bearing support 145 formed thereon in concentric relation to the annular portion 140 and in which bearing support a frictionless bearing 146 is pressed. A journal 147 formed on the casing of cylinder device is supported in the bearing 146, and two diametrically opposite sectors 148, 149 of uniform radius are also formed on said casing in concentric relation to said journal, said sectors being provided with respective arcuate flanges 150, 151 which are adapted to ride in the grooves 143, 144 respectively, whereby the cylinder device may rock about the axis of said journal in said bearing. Two pins 152, 153, placed at opposing ends of sectors 141, 142 respectively and against which sectors 148, 149, respectively, may abut, limit the rocking motion of the cylinder device to prevent sectors 148, 149 from riding out of grooves 143, 144. A helical spring 154 encircling bearing support 145 has one end anchored to a pin 155 formed on cover plate 128 and the other end anchored to a pin 156 formed on the casing of cylinder device, the purpose of said spring being to constantly urge said cylinder device toward its normal vertical position relative to the road surface but yieldable to rocking of said cylinder device, either in a clockwise or counter clockwise direction as viewed in Fig. 7 of the drawings, as limited by the pins 152, 153 respectively.

Since the operation of the embodiment represented by Figs. 5 and 7 is similar to that of the embodiments of Figs. 1, 2, 3 and 4, it is not deemed necessary to repeat such operation for an understanding of the invention. It should also be understood that the embodiment of the cylinder device 129 shown in Fig. 5 may be used with either the control valve device 79 or the release valve device 18 and the pilot valve device 22, the latter necessitating modification of the casing of said cylinder device to include addition of the associated linkage (lever arms 54, 55; links 60, 61; and anchor arms 62, 63) for operating the release valve device 18 and providing biasing means for biasing the cylinder device to its normal vertical position.

Having now described the invention, what I claim as new and desire to secure by Letters Patent, is:

1. A brake control and sideslip preventing apparatus for use with an automotive vehicle having a conventional rear axle housing with wheels mounted at each end for rotation relative thereto and including brake applying means operable in response to fluid pressure for effecting a brake application on said wheels and in response to relief of such pressure for releasing the brake application, said apparatus comprising, in combination, a source of sub-atmospheric fluid pressure, road-engaging means centrally located on said axle housing midway between said wheels, said road-engaging means normally occupying a raised position out of contact with the road surface and being operable responsively to the supply thereto of sub-atmospheric fluid pressure to a lowered position in contact with the road surface thereby to cause said vehicle to track in the intended direction of travel, and valve means having a normal position, in which said road-engaging means is cut off from said source of sub-atmospheric pressure, and being operable in response to pressure of fluid supplied to said brake applying means, when exceeding a certain degree of pressure, to an operating position in which said road-engaging means is placed in communication with said sub-atmospheric pressure source for effecting operation thereof to its lowered position.

2. A brake control and sideslip preventing apparatus for use with an automotive vehicle having a rear axle housing with wheels mounted at each end for rotation relative thereto and including brake applying means operable in response to fluid pressure for effecting a brake application on said wheels and in response to relief of such pressure for effecting release of the brake application, said apparatus comprising, in combination, a fluid reservoir normally maintained at sub-atmospheric pressure, a cylinder device operable responsively to sub-atmospheric fluid pressure, said cylinder device being suspended from said axle housing midway between said wheels and normally occupying a vertical position relative to the road surface and being rockable in a transverse direction relative to the directon of travel of the vehicle, road-engaging means in coaxial rigid relation to and axially operable by said cylinder device, when opened to said source of sub-atmospheric fluid pressure, from a raised position out of contact with the road surface to a lowered position in engagement with the road surface, in which lowered position said road-engaging means is effective, upon sideward movement of the vehicle relative to its direction of travel, for causing said cylinder device to be rocked in said transverse direction and for tracking the vehicle back into the line of intended direction of travel, and valve means responsive to pressure of fluid supplied to said brake applying means at a pressure exceeding a certain value, for opening said cylinder device to said source and for closing said cylinder device to said source upon reduction of said fluid pressure to a value below said certain value.

3. A brake control and sideslip preventing apparatus for use with an automotive vehicle having a rear axle housing with wheels mounted at each end for rotation thereon and including brake applying means operable in response to fluid pressure for effecting a brake application on said wheels and in response to relief of such pressure for effecting a release of said brake application, said apparatus comprising, in combination, a fluid pressure operable cylinder device suspended from said axle housing and normally occupying a vertical position relative to the road surface and being rockable in a transverse direction relative to the direction of travel of the vehicle, road-engaging means operable by said cylinder device from a raised position out of contact with the road surface to a lowered position in engagement with the road surface, said road-engaging means being so arranged, when in road-engaging contact, as to cause said cylinder device to be rocked in said transverse direction relative to the direction of travel of the vehicle as a result of sideward movement of the vehicle relative to its direction of travel, and valve means operable by said rocking movement of said cylinder device for effecting relief of fluid pressure from said brake applying means.

4. A brake control and sideslip preventing apparatus for use with an automotive vehicle having a rear axle housing with wheels mounted at each end for rotation relative thereto and including brake applying means operable in response to fluid pressure for effecting a brake application on said wheels and in response to relief of such pressure for effecting release of said brake application, said apparatus comprising, in combination, fluid pressure operable road-engaging means suspended from said axle housing and normally occupying a vertical position relative to the road surface and out of engagement therewith, said road-engaging means being rockable, when engaged with the road surface and upon sideward movement of the vehicle relative to its direction of travel, in a transverse direction relative to the direction of travel of the vehicle, and valve means operable by said rocking movement of said road-engaging means for relieving said brake applying means of fluid pressure.

5. A brake control and sideslip preventing apparatus for use with an automotive vehicle having a conventional rear axle housing with wheels mounted at each end for rotation relative thereto and including brake applying means operable in response to fluid pressure for effecting a brake application on said wheels and in response to relief of such pressure for effecting release of said brake application, said apparatus comprising, in combination, manually operable valve means for effecting supply and release of pressurized fluid to and from, respectively, said brake applying means, a vacuum operable cylinder device suspended from said axle housing normally in a vertical position relative to the road surface and being rockable in a direction transversely to the direction of travel of the vehicle, a piston in said cylinder device normally subjected to atmospheric fluid pressure on both sides and being operable, upon withdrawal of atmospheric fluid from one side thereof, from a first position to a second position, a road-engaging member associated with said piston and normally occupying a position out of contact with the road surface when said piston is in its first position, and being operable, by movement of said piston to its second position, to a different position in which it engages the road surface and is effective for causing said rocking movement of said cylinder device upon sideward movement of the vehicle relative to its direction of travel, pilot valve means operable to an operating position responsively to the pressure of fluid supply, as effected by said manually operable valve means to said brake applying means in excess of a certain predetermined degree of pressure, for connecting said one side of said piston to a vacuum source for withdrawing fluid from said one side of the piston and operative to a normal position responsively to pressure of said fluid supply, when below said certain degree, to close said one side of said piston to said vacuum source and open it to atmosphere, whereby said road-engaging member is operated to said respective different and normal positions, and a release valve device operable responsively to said operation of said pilot valve means to its operating position to effect relief of fluid pressure from said brake applying means.

6. A brake control and sideslip preventing apparatus for use with an automotive vehicle having a conventional rear axle housing with wheels mounted at each end for rotation thereon and including brake applying means operable in response to fluid pressure for effecting a brake application on said wheels and in response to relief of such pressure for releasing the brake application, said apparatus comprising, in combination, a manually operable cylinder device for effecting supply of pressurized fluid to said brake applying means at varying degrees of pressure, a fluid reservoir normally maintained at sub-atmospheric pressure, a fluid pressure operable cylinder device normally subjected to fluid at atmospheric pressure and being centrally located on said axle housing midway between said wheels and normally occupying a vertical position relative to the road surface, said fluid pressure operable cylinder device being rockable from said vertical position in a transverse direction relative to the intended direction of travel of the vehicle, a road-engaging member operable by said fluid pressure operable cylinder device, when subjected to said fluid at sub-atmospheric pressure, from a raised position out of contact with the road surface to a lowered position in contact with the road surface for causing the vehicle to track in the intended direction of travel, said road-engaging member being effective in its lowered position, upon occurrence of sideward movement of said vehicle wheels relative to the intended direction of travel, for causing said rocking movement of said fluid pressure operable cylinder device, biasing means for returning said road-engaging member from said lowered position to its said raised position upon restoration of atmospheric pressure to said fluid pressure operable cylinder device, a pilot valve device communicably interposed between said manually operable cylinder device and said fluid pressure operable cylinder device, said pilot valve device having a first position, in which said fluid pressure operable cylinder device is cut off from said source of sub-atmospheric and opened to atmosphere, and being operable in response to pressurized fluid supply to said brake applying means, as effected by said manually operable cylinder device in excess of a certain degree of pressure, to a second position in which said fluid pressure operable cylinder device is opened to said source of sub-atmospheric fluid pressure, a release valve device operable from a normal position, in which pressurized fluid is supplied to said brake applying means, to a release position, in which said brake applying means is relieved of pressurized fluid, and means associated with said fluid pressure operable cylinder device and operable by said rocking movement thereof for effecting operation of said release valve device to its release position.

7. The combination as defined in claim 6 wherein the fluid pressure operable cylinder device comprises a bracket fastened to the axle housing, a cylinder rockably supported by said bracket, biasing means for normally maintaining said cylinder in an axially vertical position relative to the road surface, a piston coaxially operable in said cylinder, said piston having one side constantly open to atmosphere and the other side open to a sub-atmospheric pressure chamber which is normally open to atmosphere and being connectible to the sub-atmospheric pressure source by the pilot valve device, a piston stem extending coaxially from said other side of said piston through said chamber and terminating exteriorly of the cylinder to which terminus the road-engaging member is fastened, and a pair of guide rods for maintaining the road-engaging member in a line parallel to the intended direction of travel of the vehicle, said guide rods being slidably operable in respective bores formed exteriorly of said cylinder in diametrally opposite relation to each other and parallel to said piston stem.

8. The combination as defined in claim 7 wherein the piston stem is further characterized by having a coaxial bore formed therein in which bore the biasing means for returning the road-engaging member to its normal position is disposed.

9. The combination as defined in claim 6 wherein the means for effecting operation of the release valve device comprises a piston stem associated with the release valve device, said piston stem being operable in an axis fixed relative to the fluid pressure operable cylinder device and parallel to the axis of said cylinder device when the latter is in its normal vertical position, a pair of fulcrum arms affixed to the release valve device in diametrally opposite relation, parallel to each other and to the axis of said piston stem, a pair of lever arms each having one end piovtally fastened to the piston stem and extending directly oppositely from each other and normally perpendicularly to the piston stem, each of said lever arms being also pivotally connected substantially intermediate its ends to the respective fulcrum arm, a pair of bracket arms each affixed at one end to the fluid pressure operable cylinder device and extending directly oppositely from each other and perpendicularly to the axis of said cylinder device, and a pair of link rods each respectively and pivotally connecting the other ends of said bracket arms to the other ends of said lever arms, whereby upon rocking movement of said cylinder device operation of said piston stem is effected to cause operation of said release valve device.

10. A brake control and sideslip preventing apparatus for use with an automotive vehicle having a conventional rear axle housing with wheels mounted at each end for rotation thereon and including brake applying means responsively operable to fluid pressure for effecting a brake application on said wheels and to relief of such pressure for releasing said brake application, said apparatus comprising, in combination, manually operable means for effecting supply and relief of pressurized fluid to and from, respectively, said brake applying means, road-engaging means normally occupying a raised position out of contact with the road surface and being operable, when subjected to sub-atmospheric fluid pressure, to a lowered position in contact with the road surface for causing a retarding and directional effect on the vehicle, a source of sub-atmospheric fluid pressure, a pilot valve normally occupying a first position, in which said road-engaging means is cut off from said source of sub-atmospheric pressure and open to atmosphere, and being operable in response to said pressurized fluid supplied to said brake applying means, when in excess of a certain degree of pressure, to a second position in which said road-engaging means is cut off from atmosphere and opened to said source of sub-atmospheric pressure, a release valve having an open position, in which pressurized fluid may be supplied to said brake applying means, biasing means for moving the release valve to a closed position in which said pressurized fluid supply is cut off from said brake applying means, and a diaphragm operable device operable, in response to said sub-atmospheric fluid pressure supplied to said road-engaging means, for effecting cyclical operation of said release valve alternately between its said open position and closed position, during such time that said pilot valve is in its second position, whereby to cause a cyclical, alternate pulsating brake application and release thereof during such time that said road-engaging means is in contact with the road surface.

11. The combination defined in claim 10 wherein the diaphragm operable device comprises a casing, a diaphragm operable in said casing and having one side constantly open to atmosphere and the opposite side open to a sub-atmospheric chamber which is in constant communication with the pilot valve by way of a choke and through which choke fluid at sub-atmospheric pressure is admitted at a restricted rate to said chamber when said pilot valve is in its second position, a diaphragm stem movable with said diaphragm and having a projecting portion at one end for engaging and operating the release valve to its open position upon movement of said diaphragm to a normal position responsively to atmospheric pressure admitted into said chamber, said diaphragm being operable to a different position upon closing of said chamber to atmosphere and admission of fluid at sub-atmospheric pressure thereinto by way of said choke, a control valve for opening and closing of chamber to atmosphere, and a snap-acting mechanism operable by said stem, when said diaphragm moves to its normal position, to effect movement of said control valve to a seated position, in which said chamber is closed to atmosphere, and when said diaphragm moves to its different position, to effect movement of said control valve to an unseated position in which said chamber is opened to atmosphere.

12. The combination defined in claim 11 wherein the snap-acting mechanism comprises an inner stem fixed to the control valve for effecting movement thereof, said inner stem being coaxially disposed within the diaphragm stem and movable coaxially relative thereto, a knob formed on said inner stem, and a snap ring movable over said knob in one direction by movement of said diaphragm stem in a corresponding direction to cause snap movement of said knob and said inner stem and therefore movement of the control valve to one of its positions, said snap being movable over said knob in an opposite direction to said one direction by corresponding directional movement of said diaphragm stem to cause snap movement of said knob and said stem and therefore movement of the control valve to its other position.

13. A brake control apparatus for use with an automotive vehicle having a conventional rear axle housing with wheels mounted at each end for rotation thereon and including brake applying means operable in response to fluid pressure for effecting a brake application on said wheels and in relief of such pressure for effecting a release of said brake application, said apparatus comprising, in combination, a fluid pressure operable cylinder device suspended from said axle housing and normally occupying a vertical position relative to the road surface and being rockable in a transverse direction relative to the direction of travel of the vehicle, road-engaging means operable by said cylinder device from a raised position out of contact with the road surface to a lowered position in engagement with the road surface, said road-engaging means being so arranged, when in road-engaging contact, as to cause said cylinder device to be rocked in said transverse direction as a result of sideward movement of the vehicle relative to its direction of travel, and valve means operable in response to pressure of fluid supplied to said brake applying means, when in excess of a certain degree, for causing said cylinder device to be subjected to fluid pressure whereby said road-engaging means is operated to its lowered position and is maintained in said lowered position during such time that the fluid pressure supplied to said brake applying means is in excess of said certain degree.

14. A brake control and sideslip preventing apparatus for use with an automotive vehicle having a conventional rear axle housing with wheels mounted at each end for rotation relative thereto and including brake applying means operable in response to fluid pressure for effecting a brake application on said wheels and in response to relief of such pressure for releasing the brake application, said apparatus comprising, in combination, a source of sub-atmospheric fluid pressure, road-engaging means normally occupying a raised position out of contact with the road surface and being operable to a lowered position in engagement with the road surface, a cylinder device centrally located on said axle housing midway between said wheels, and operable responsively to sub-atmospheric pressure for moving said road-engaging means to its lowered position in contact with the road surface thereby to cause said vehicle to track in the intended direction of travel, and valve means having a normal position, in which said cylinder device is cut off from said source of sub-atmospheric pressure, and being operable in response to pressure of fluid supplied to said brake applying means, when exceeding a certain degree of pressure, to an operating position in which said cylinder device is placed in communication with said sub-atmospheric pressure source for effecting operation thereof to its lowered position.

References Cited in the file of this patent
UNITED STATES PATENTS

| | | |
|---|---|---|
| 2,687,191 | Shannon | Aug. 24, 1954 |
| 2,702,096 | Rockwell | Feb. 15, 1955 |